Jan. 4, 1944.  A. W. NELSON  2,338,197
RETICULATED METAL WALKWAYS AND METHOD OF PRODUCING SAME
Filed Sept. 4, 1941
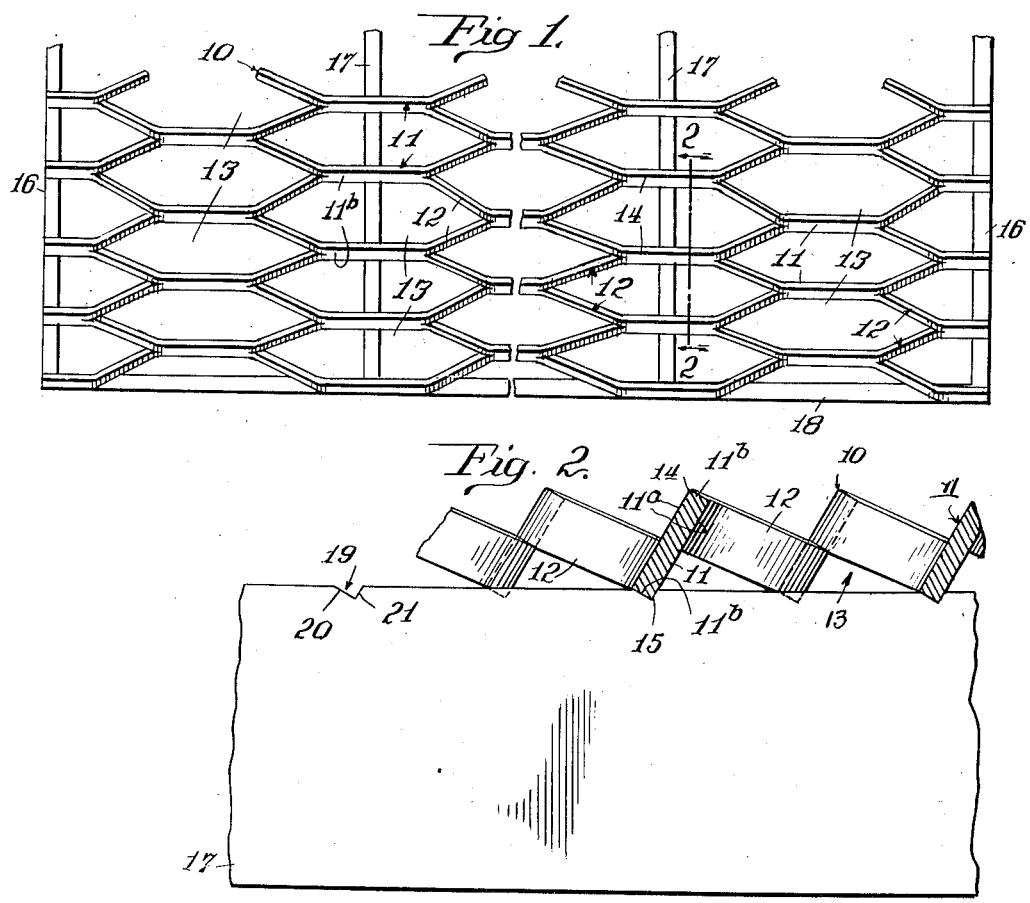
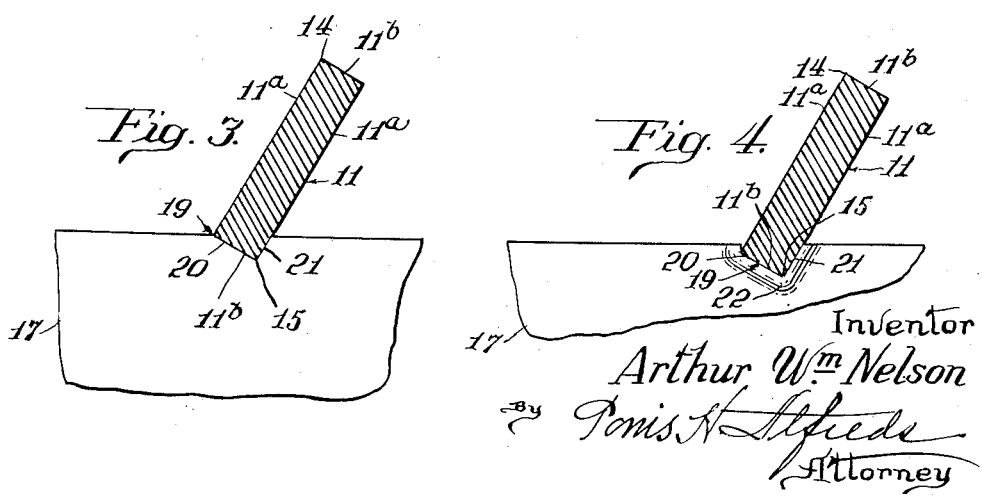
Inventor
Arthur Wm Nelson Patented Jan. 4, 1944

2,338,197

UNITED STATES PATENT OFFICE 2,338,197

RETICULATED METAL WALKWAY AND METHOD OF PRODUCING SAME

Arthur W. Nelson, Park Ridge, Ill., assignor to Apex Railway Products Co., Chicago, Ill., a corporation of Delaware Application September 4, 1941, Serial No. 409,446

7 Claims. (Cl. 189—82)

This invention relates to improvements in reticulated metal walkways and method of producing same and it consists of the matters hereinafter described and more particularly pointed out in the appended claims. The invention is more especially concerned with anti-skid metallic walkways. One type of walkway for which the invention is particularly adapted is as a safety running board on a freight car, and which includes an open work metal tread panel of rectangularly shaped, connected units that have marginal parts welded to edge portions of suitable supporting bars.

An example of the kind of panel above mentioned is one made of expanded metal. It includes integral strands and bonds having edgewise parts disposed other than perpendicular to the plane of the panel as a whole. Heretofore, in use of expanded metal as a tread panel, it has been the custom to so operate upon certain of said bonds, as to twist them out of their original planes into planes perpendicular to the associated supporting bars so as to present flat edges to the bars for welding thereto as by electric or resistance welding. The operation of twisting the bonds as above mentioned is not typical of the manufacture of expanded metal, requires the performance of additional operations and therefore increases the cost of making the walkway.

One of the objects of the invention is to provide a walkway of this kind which costs less to manufacture than similar walkways as heretofore made and without any sacrifice in the strength or in the anti-slip tread safety feature of the walkway which has made this type of walkway desirable for use as a running board on a freight car roof.

Another object of the invention is to provide a walkway having an expanded metal tread panel and supporting bars therefor, which does not require that the bond portions of the panel be twisted out of their normal plane to provide such engagement of said portions with said bars as will insure a good weld therebetween.

Also, it is an object of the invention to provide a walkway of this kind wherein the supporting bars are so made along one edge as to receive and hold the marginal parts of the bond portions of the panel in place against slippage under the pressure of resistance welding.

Again, it is an object of the invention to provide an improved method of making a walkway of this kind whereby it is unnecessary to twist any of the bond portions of the expanded metal panel out of the original planes and at the same time insure a good, clean and strong weld of said bond portions to the associated bars of the supporting frame of the walkway.

The above mentioned objects of the invention, as well as others, together with the several advantages thereof will more fully appear as the specification proceeds.

In the drawing:

Fig. 1 is a top plan view of a fragment of a walkway embodying the preferred form of the invention.

Fig. 2 is a detail vertical sectional view through a part of the walkway, on an enlarged scale, as taken on the line 2—2 of Fig. 1.

Fig. 3 is a fragmentary detail sectional view illustrating the initial engagement of a bond portion of the expanded metal panel in an associated recess in one of the supporting bars of the walkway, on a scale somewhat enlarged over that shown in Fig. 2.

Fig. 4 is a view similar to that shown in Fig. 3, after a resistance welding operation has been performed on the parts shown therein.

Referring now in detail to that embodiment of the invention illustrated in the accompanying drawing, 10 indicates as a whole, the reticulated tread panel of the improved walkway, which in this instance is shown as composed of a piece of expanded metal. Said expanded metal panel includes bond portions 11 and strand portions 12 integrally connected thereto to provide substantially elongated hexagonally shaped openings 13 as shown in Fig. 1. The bond portions and the strand portions are disposed edgewise and inclined to a plane perpendicular to the plane of the panel as a whole. The bond portions are twice the width of the strand portions and due to their angular disposition in the panel, diametrically opposite sectional corner edge portions 14 and 15 respectively of said bond portions define the so-called thickness of the panel. Said corner edge portions provide an anti-slip tread surface for either side of the panel.

The panel above described is attached, as will later appear, to an open supporting frame, which as here shown includes side and intermediate members 16 and 17 respectively. These members are welded at their ends to the end members 18 of the frame, only one of which appears in Fig. 1. The side and intermediate members 16 and 17 extend in a direction at a right angle to that of the bonds 11 of the expanded metal panel, while the end members 18 of the frame extend in a direction parallel with said bonds.

The side, intermediate and end members 16—17 and 18 respectively of the supporting frame are shown as in the form of flat bars which are wider than they are thick. Said bars are disposed edgewise and perpendicular to the plane of the panel 10 of expanded metal as a whole.

Each side and intermediate bar is provided in its top edge with notches or recesses 19 that are spaced longitudinally along said edge to correspond with the spacing between the bond portions 11—11 in each row thereof. As the bond portions 11—11 in one row are disposed or offset intermediate the bond portions 11—11 in adjacent rows thereof, the recesses 19 in one bar 16 or 17 are offset with respect to those in the adjacent bars.

Each notch or recess 19, as best appears in Fig. 2, is substantially V-shaped and the side edges 20 and 21 thereof are disposed to form an angle of approximately 90° which corresponds with the angle between the side surfaces 11a—11a and edge surfaces 11b—11b of the bond portions 11.

The panel 10 is attached to the bars 16 and 17 by resistance welding. After the bars 16, 17 and 18 are welded together to provide the open supporting frame, a panel 10 is placed upon the frame so that the bottom edge portion of each bond portion of the panel will engage and fit in its associated recess 19 in the bars of the frame as best shown in Fig. 3. The frame and the panel thus assembled are placed in a resistance welding machine. In the welding operation of the machine, the panel and the frame are moved toward each other into firm engagement under pressure. By reason of the notches or recesses, relative slippage between said panel and frame is prevented. Also, under the welding pressure of the welding machine, the bottom marginal parts of the bond portions are pressed firmly into the recesses. As the bottom edge 11b of each bond engages flatly against the edge part 20 of its recess and as a portion of one of the faces 11a of each bond engages flatly against the edge part 21 of its recess, a strong firm weld is provided between said bond portions and said bars, free from any burned portions that would cause the metal to crumble. As the bond portions are forced into the recesses under welding pressure, parts of the bars adjacent the surfaces 20 and 21 of the notches or recesses are displaced laterally as a bulge or swelling 22 as appears in Fig. 4. Under this condition, the recesses 19 are somewhat deeper than originally made and this condition also appears in Fig. 4.

With the structure above described, a good bonding engagement or contact is possible between the bond portions of the panel and the frame bars, without the necessity of distorting or twisting the bonds out of their normal planes. This leaves the upper corner edge 14 of each bond in that position forming a relative sharp tread surface edge which greatly increases the anti-slip qualities of the walkway for greater safety under any weather conditions.

Also, by this arrangement described, burning of corner edge portions of the bonds during the resistance welding operation is obviated. Again, because it is not necessary to twist or distort the bonds from their normal planes, typical expanded metal formation may be used. Thus a less expensive, better welded and safer walkway is provided.

While in describing the invention, I have referred in detail to the form, arrangement and construction of the parts involved, the same is to be considered only in the illustrative sense so that I do not wish to be limited thereto except as may be specifically set forth in the appended claims.

I claim as my invention:

1. A walkway embodying therein a metal tread panel having openings therethrough defined by strand portions and connecting bond portions having lower flat edge surfaces disposed in planes inclined to the plane of the panel and having side surfaces perpendicular to said edge surfaces, and metallic bars having edge portions to which said panel is attached for support, at least certain of said bars having recesses in said edge portions of such shape that the lower flat edge surfaces and portions of said side surfaces of certain of said bond portions engage flatwise therein and are welded thereto.

2. A walkway embodying therein a metal tread panel having openings therethrough defined by strand portions and connecting bond portions having lower flat edge surfaces disposed in planes inclined to the plane of the panel and having side surfaces perpendicular to said edge surfaces, and metallic bars having edge portions to which said panel is attached for support, at least certain of said bars having substantially V-shaped recesses in said edge portions having right angled surfaces in which corner parts of certain of said bond portions engage flatwise and are welded thereto.

3. A walkway embodying therein a metal tread panel having openings therethrough defined by strand portions and connecting bond portions having lower flat edge surfaces disposed in planes inclined to the plane of the panel and having side surfaces perpendicular to said edge surfaces, and metallic bars having edge portions to which said panel is attached for support, at least certain of said bars having recesses in said edge portions of such shape that the lower flat edge surfaces and portions of said side surfaces of certain of said bond portions are engaged flatwise therein and are resistance welded thereto.

4. A walkway embodying therein a metal tread panel having openings therethrough defined by strand portions and connecting bond portions having lower flat edge surfaces disposed in planes inclined to the plane of the panel and having side surfaces perpendicular to said edge surfaces, and metallic bars having edge portions to which said panel is attached for support, at least certain of said bars having substantially V-shaped recesses in said edge portions having right angled surfaces in which corner parts of certain of said bond portions engage flatwise and are resistance welded thereto.

5. A walkway embodying therein a panel of expanded metal having a plurality of integrally connected strand portions and bond portions, the latter portions having lower flat edge surfaces disposed in planes inclined to the plane of the panel and having side surfaces perpendicular to said edge surfaces and metallic bars for supporting said panel, at least certain of said bars having at least one margin disposed parallel with the plane of the panel as a whole and in which transverse recesses are provided and which recesses are of such shape that the lower flat edge surface and portions of said side surfaces of certain of said bond portions engage flatwise therein and are welded thereto.

6. A walkway embodying therein a panel of expanded metal having a plurality of integrally connected strand portions and bond portions, the latter portions having lower flat edge surfaces disposed in planes inclined to the plane of the panel and having side surfaces perpendicular to said edge surfaces and metallic bars for supporting said panel, at least certain of said bars having at least one margin disposed parallel with the plane of said panel as a whole and in which margins are substantially V shaped transverse recesses having right angled surfaces with which the lower flat edge surfaces and portions of said side surfaces of certain of said bond portions engage flatwise and are welded thereto.

7. A method of making a reticulated metal walkway structure which consists in providing a frame including a plurality of metallic members, in providing a reticulated metal tread panel having strand portions and connecting bond portions, the latter portions having lower flat edge surfaces disposed in planes inclined to the plane of the panel and side surfaces perpendicular to said edge surfaces, forming transverse recesses in the upper part of at least certain of said frame members and which recesses are of such shape as to flatwise receive parts of certain of said bond portions, having said lower flat edge surfaces and said side surfaces, assembling the tread and frame members so that said parts of said bond portions engage flatwise in said recesses and then welding said parts of said bond portions to those parts of said frame members defining said recesses.

ARTHUR WM. NELSON.